Jan. 25, 1944.　　　　　J. SCHAUB　　　　　2,339,883
METHOD AND APPARATUS FOR PRODUCING SOLID FATTY FOOD PRODUCTS
Filed June 30, 1939　　　3 Sheets-Sheet 1

INVENTOR
JACOB SCHAUB
BY
*H. Philip Churchill*
ATTORNEY

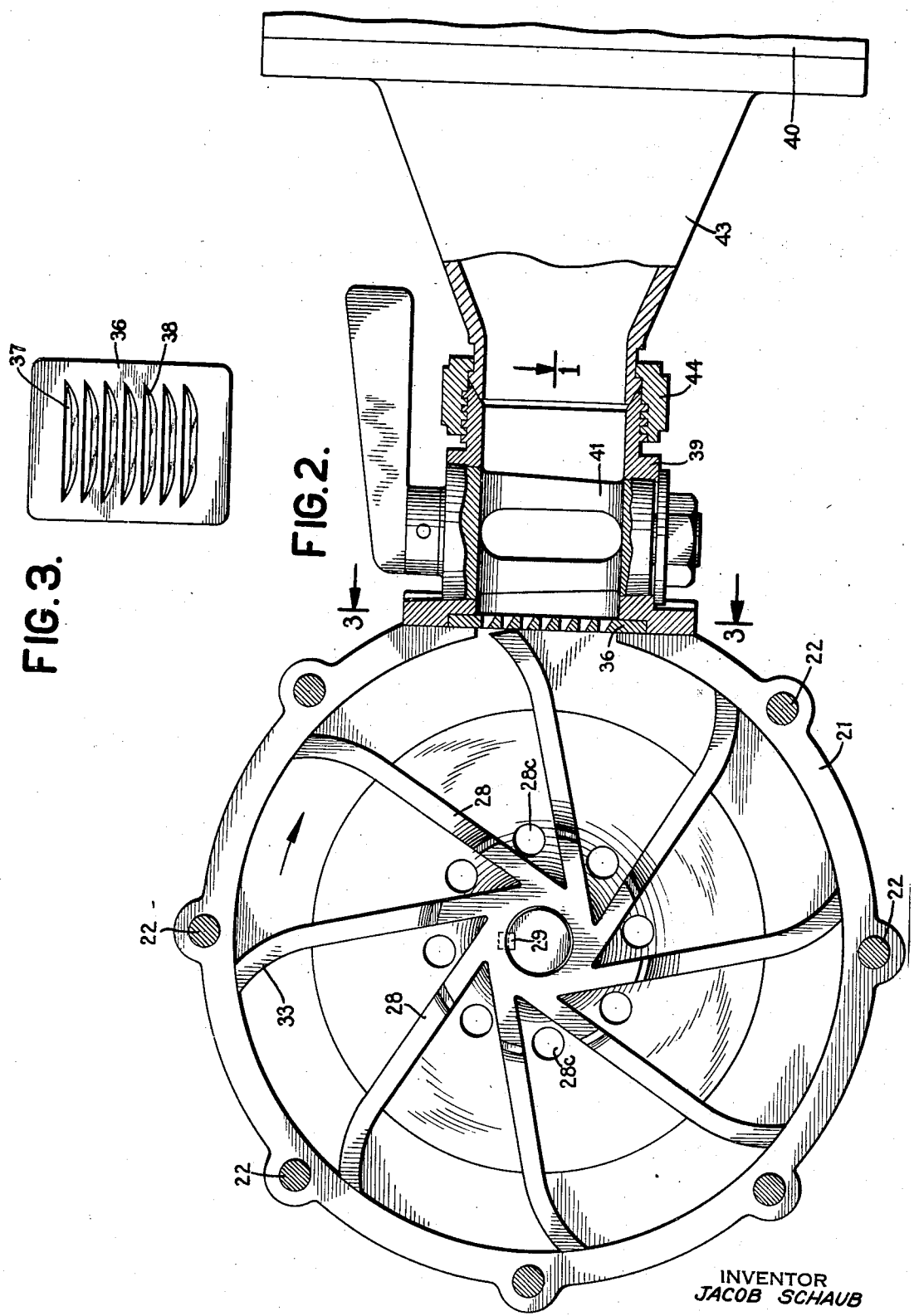

Jan. 25, 1944.  J. SCHAUB  2,339,883
METHOD AND APPARATUS FOR PRODUCING SOLID FATTY FOOD PRODUCTS
Filed June 30, 1939  3 Sheets-Sheet 3
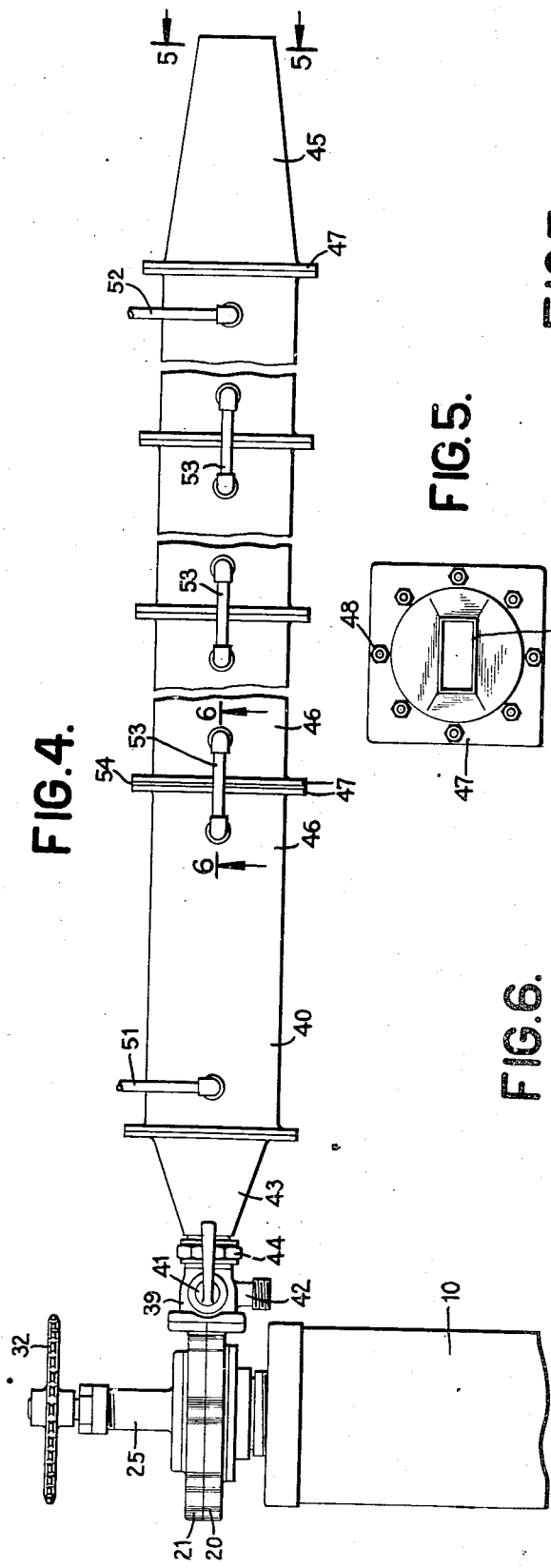
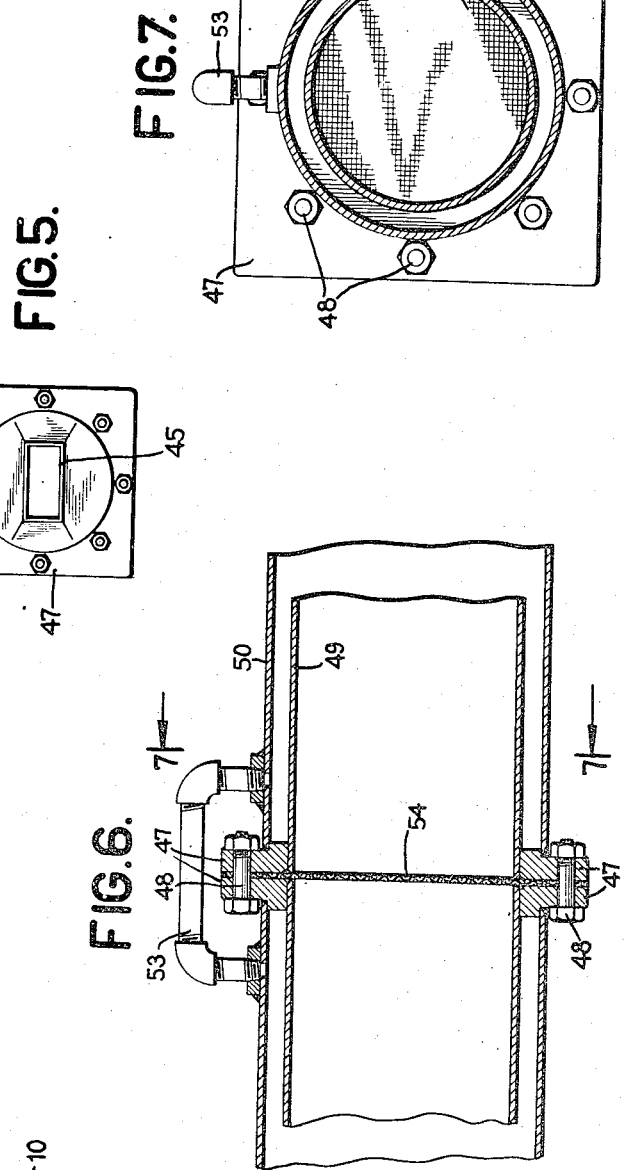
INVENTOR
JACOB SCHAUB
BY
ATTORNEY Patented Jan. 25, 1944

2,339,883

UNITED STATES PATENT OFFICE 2,339,883

METHOD AND APPARATUS FOR PRODUCING SOLID FATTY FOOD PRODUCTS

Jacob Schaub, Westfield, N. J., assignor, by mesne assignments, to The Best Foods, Inc., New York, N. Y., a corporation of New Jersey Application June 30, 1939, Serial No. 282,019

9 Claims. (Cl. 99—122)

This invention relates to the continuous production of a fatty food product such as margarine and more particularly relates to a process and apparatus for continuously producing a high quality margarine.

The batch process has been used heretofore in making margarine in order to make a high quality product having the proper texture, grain, and taste. This batch treatment involves chilling an emulsion of oil and water by means of an internally cooled chilling roll and scraping the crystals of solidified emulsion from the roll. These crystals must then be kneaded, worked, salted and blended and excess moisture removed therefrom before the product is completed and made up into bars or cakes of the desired form. The worked material must also be allowed periods of rest between certain of these treatments, amounting to several hours under the proper conditions of temperature and humidity in order to obtain a high quality product.

One object of my invention is to provide a process and apparatus for producing margarine rapidly in a continuous manner without sacrificing the high standard of quality in the product as produced by the batch process.

It is a further object of my invention to produce a finished margarine in a rapid, simple, and continuous manner whereby the removal of water, working, kneading, and periods of rest for the material are eliminated.

Another object of my invention is to provide a process and apparatus for super-cooling an emulsion of oil and water while maintaining the super-cooled material in such a state that it will flow readily and subsequently allowing the emulsion to solidify under controlled conditions.

The invention will be best understood by reference to the apparatus constituting an embodiment of my invention illustrated in the accompanying drawings, in which Figure 1 is a horizontal sectional view of one end of a cooling chamber showing the means for transferring the super-cooled emulsion in a flowable condition to the solidifying chamber.

Figure 2 is a vertical sectional view of this transferring apparatus taken on the line 2—2 of Figure 1 and illustrating one end of the solidifying chamber.

Figure 3 is a rear elevation of the grating illustrated in section in Figure 2.

Figure 4 is a top plan view of one end of the cooling chamber, the transferring apparatus and the solidifying chamber.

Figure 5 is an end elevation of the solidifying chamber taken on the line 5—5 of Figure 4.

Figure 6 illustrates a vertical sectional view of an intermediate portion of the solidifying chamber taken on the line 6—6 of Figure 4, and Figure 7 is a vertical sectional view through the solidifying chamber taken on the line 7—7 of Figure 6.

Figure 1:
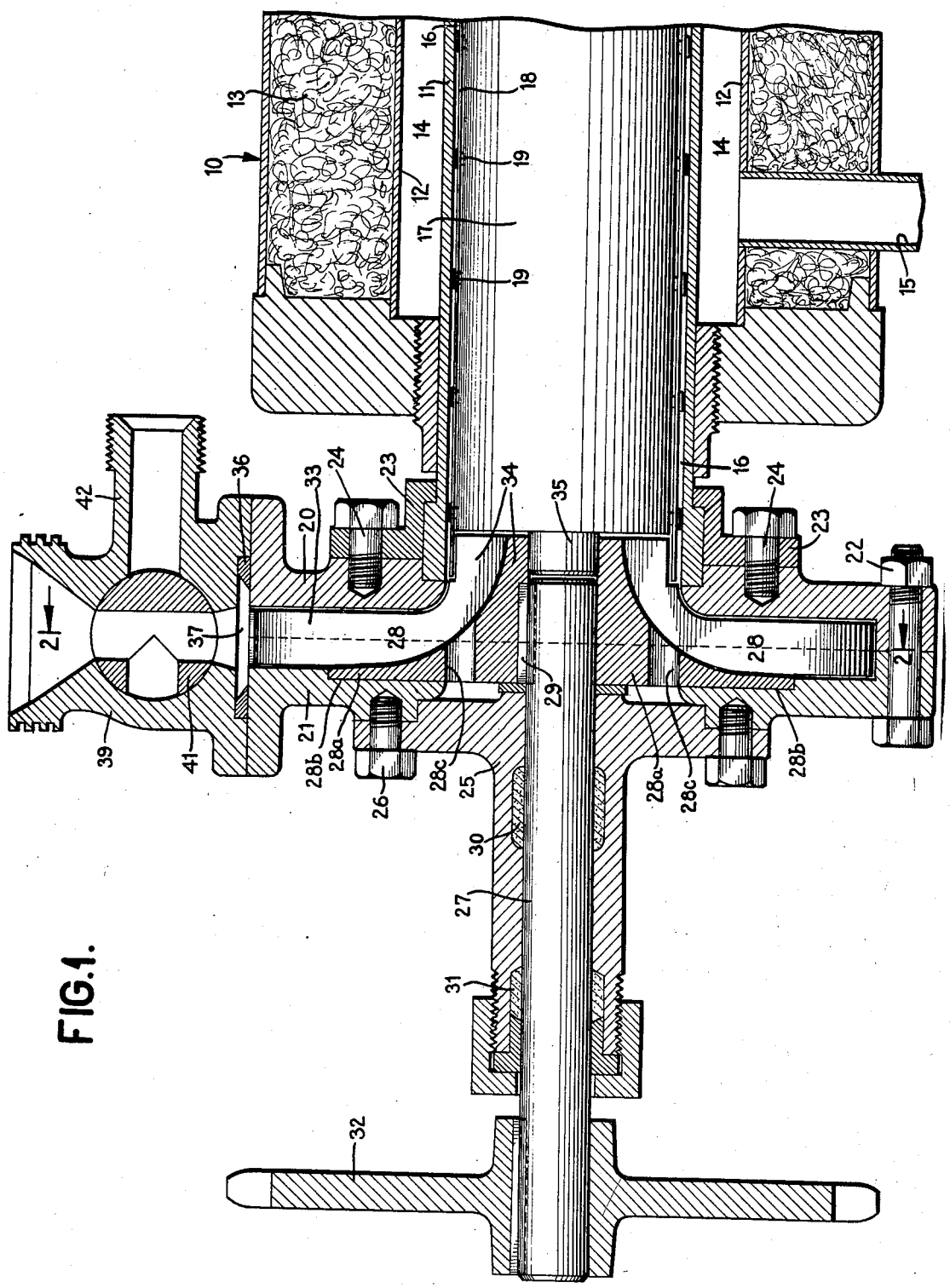

In the drawings, numeral 10 designates the cooling chamber generally, which may be of any suitable form for super-cooling an emulsion while maintaining the super-cooled emulsion in a liquid or semi-liquid state. In the form illustrated, this cooling chamber 10 comprises a shell 11 surrounded by cooling jacket 12 for the circulation of a refrigerating medium, and externally insulated against heat absorption by the insulating material 13. The cooling medium, which may be brine or other suitable liquid or gaseous refrigerant, may be introduced into the space 14 between the shell 11 and the jacket 12 through the inlet 15 and withdrawn at the inlet end of the cooling chamber (not shown). The emulsion, including the ingredients to be incorporated to form the finished margarine, is introduced under pressure at the inlet end of the cooling chamber 11 to the space 16 between the shell 11 and the rotor 17. The rotor 17 preferably takes up most of the space within the shell 11, leaving only a narrow opening through which the emulsion can be advanced through the cooling chamber. Flat scraper blades 18, or other suitable form of scrapers and/or agitators are preferably attached to the rotor by the studs 19, so that the flow of chilled emulsion longitudinally through the space 16 is impeded as little as possible. The scrapers 18 may be helical to assist the flow of liquid through the space 14. This rotor 17 may be rapidly rotated by some suitable means (not shown) at the inlet end of the cooling chamber.

A pump is preferably attached to the cooling chamber at the outlet end and may be housed in the two pump housing halves 20, 21 bolted together, as by means of the bolts 22. This pump housing is preferably rigidly attached to the outlet end of the shell 11 as by means of a collar 23 and the bolts 24. Bearing 25 may be attached to the outer end of the housing portion 21 by means of the bolts 26, to support a shaft 27 which has a series of rotary pump blades 28 fixed thereto by means of the key 29. Bearing 25 is preferably provided with suitable packing glands 30 and 31. Shaft 27 may be rotated by means of the sprocket wheel 32 driven from any suitable source of power (not shown).

The blades 28 of the pump are preferably formed integrally with the annular hub plate 28a and are inclined rearwardly with respect to the direction of rotation thereof, as illustrated in Figure 2. This annular hub plate 28a preferably is seated in a recessed portion 28b of the housing section 21 and is provided with openings 28c. Some of the emulsion may thus work through the openings 28c to serve as a lubricant for the hub plate 28a and to relieve axial pressure thereon. The outer ends of blades 28 are also preferably curved rearwardly as shown at 33, and the central or hub portions of the blades and the hub plate 28a may be tapered towards the rotor 17 as illustrated at 34 in Figure 1. These tapered hub portions 34 thus rotate about the stub shaft 35 fixed to one end of the rotor 17.

The pump is designed and arranged to withdraw the chilled emulsion from the space 16 near the outlet of the cooling chamber 10 and to throw this super-cooled liquid radially outwardly so that it is forced through the grating 36. Grating 36 is preferably provided with a series of horizontal openings 37, having straight upper surfaces and shallow dish-shaped lower surfaces. These lower surfaces are also tapered downwardly, as illustrated at 38, to provide knife blades with the sharp edges directed towards the ends of the pump blades 28.

The material expelled by the pump through the grating 36 passes through a valve 39 directly into a solidifying chamber 40. Under ordinary operating conditions the valve 39 will be maintained in the position illustrated in Figure 1. If desired, however, the three-way rotary portion 41 of the valve 39 may be turned to by-pass the material through the pipe 42 instead of directing it into the solidifying chamber 40. The purpose of this by-pass valve will be described hereinafter.

The solidifying chamber is preferably of uniform cross section throughout the major portion of its length and is tapered at the inlet end 43 to provide an inlet portion having a cross section increasing uniformly in size from the valve 39 to the main portion of the solidifying chamber 40. The tapered end 43 of solidifying chamber 40 may be removably connected to valve 39 by means of the collar 44. At its outlet end, the solidifying chamber 40 is preferably provided with a tapered outlet ending in the extruding nozzle or template 45 to shape the margarine into a continuous bar of the desired size.

The main portion of the solidifying chamber may be constructed in a plurality of sections 46 having annular flanges 47 at their ends which may be bolted together, as by the bolts 48. The several sections 46 of the solidifying chamber 40 may be provided with an inner shell 49 and an outer jacket 50 so that a temperature controlling medium may be circulated through the space therebetween. The cooling or heating medium may be introduced, for example, at 51 and withdrawn at 52, the several sections of the jacket being connected in series by means of the pipes 53.

At a point preferably fairly close to the inlet 43 of the solidifying chamber 40, a screen 54 may be provided clamped between two of the flanges 47, for example, at the juncture of the first and second sections 46 of the solidifying chamber.

In operating the apparatus for making margarine, the mixture of ingredients, comprising an emulsion of fat or oil, water, salt and other materials in the proportions desired in the final product, is introduced under pressure into the space 16 at the inlet end of the cooling chamber 10. During the passage of the emulsion through the cooling chamber 10, the emulsion is forced longitudinally of the chamber in a thin layer through the space 16 and is constantly agitated by rotation of the rotor 17 carrying the scraper blades 18. A chilling medium is circulated through the space 14 and preferably maintains the space 16 at a temperature well below the solidifying point of the emulsion being chilled. For making margarine with an emulsion having a solidifying point of 25° C., for example, the liquid emulsion is preferably super-cooled to a temperature of about 5° C., i. e., a temperature about 20° below its hardening point. During passage of this super-cooled material through the cooling chamber 10 it is maintained in a flowable condition by the constant agitation of the blades 18.

The pump blades 28 are rotated during this time, preferably being driven by a source of power independent of the drive for the rotor 17, through the sprocket wheel 32. The rotation of the pump blades 28 serves to withdraw the chilled emulsion from the space 16 and thus to effectively decrease back pressure on the material fed into the cooling chamber 10. In fact, this pump serves as a booster whereby the original pressure under which the emulsion is introduced into the cooling chamber may be substantially lessened. The super-cooled liquid emulsion, as it is withdrawn from the outlet end of the cooling chamber 10 by the pump, is immediately thrown radially outward and is kept in motion in the pump so that it is not afforded an opportunity to solidify. The agitation is continued and, in fact, preferably increased by the blades 28, as compared with the agitating effected by the blades 18 so that any solid particles which have formed are more or less broken up. As this material reaches the outer edge of the blades 28, it is forced under pressure through the grating 36, the valve 39, and directly into the solidifying chamber 40.

When the apparatus is first started however, the first of the emulsion to come through may not be sufficiently super-cooled or will not be in a suitable state for delivery to the solidifying chamber. This material may be by-passed through the pipe 42 into a separate container by a proper adjustment of the valve 39, and as soon as the consistency of the material coming out of the pipe 42 is satisfactory, valve 39 may be turned to deliver the super-cooled emulsion to the solidifying chamber 40.

Any lumps or solid particles which may have been formed in the material during passage through the cooling chamber and which have not been broken by the agitation are broken up as they pass through the grating 36. The flow of super-cooled emulsion into the tapered section 43 of the solidifying chamber 40 gradually decreases in velocity and the emulsion becomes solidified. I prefer to employ the screen 54 in the solidifying chamber 40 to develop a slight back pressure in the solidifying chamber and thus ensure the chamber being completely filled with the solidified material. If some means of this nature is not provided, the super-cooled emulsion is very apt to flow into the solidifying chamber in overlapping layers and form distinct strata or folds which will be readily apparent after the material has been extruded from the nozzle 45 at the outer end of the solidifying chamber. Whatever the explanation for the operation of the screen may be, I have found that the use of a screen, in approximately the position illustrated, serves to eliminate satisfactorily this stratification of the product.

To make the passage of the solidified product through the chamber 40 easier, this chamber is preferably jacketed so that warm water at a temperature, for example, of 32° C. may be circulated to partially melt the solidified product next to the shell 49 and thus reduce frictional contact therewith. The product will thus be continuously extruded through the template 45 in the form of a bar which may be cut into blocks of the desired size and shape for packaging. A cutting and wrapping apparatus may be attached directly to the outlet end of the solidifying chamber, if desired.

It will be noted that the emulsion, after coming under the influence of the cooling medium, is constantly agitated until it is introduced into the solidifying chamber 40. The super-cooled flowable emulsion is thus introduced into the tapered inlet 43 in a homogeneous condition and solidifies quickly after the agitation is stopped. A uniform fine grained texture is thereby obtained with all of the water and other ingredients uniformly distributed throughout the mass.

The agitation of the material until it flows into the solidifying chamber is very important, not only for the production of a smooth high quality product, but also in preventing clogging of the apparatus. If a super-cooled emulsion of this nature is not constantly and thoroughly agitated, solidification is apt to occur at some point prior to the introduction of the material into the solidifying chamber 40 with a consequent clogging of the whole system. Should the system become clogged in this manner, it would be necessary to clean out the whole apparatus before starting operations again.

In addition to the economies in space, equipment, and time made possible by my invention, the production of margarine is also placed on a much more sanitary basis inasmuch as the product is completely enclosed in the apparatus until it emerges in finished form. Enclosed automatic cutting and packaging apparatus may be readily employed so that the product emerges from the apparatus in packaged form.

It will be apparent that other forms of cooling chambers may be employed in which the ratio of cooling surface to volume of liquid being chilled is sufficiently high to permit rapid cooling. It is highly desirable to provide a cooling chamber in which the passage for liquid has as few obstructions as possible, in order to minimize solidification of the liquid in the cooling chamber.

The use of the extrusion nozzle 45 is not essential to the operation of the apparatus, and other forms and shapes of hardening chambers may be employed provided the super-cooled liquid is allowed to solidify in a quiet unagitated state.

The pump at the outlet end of the cooling chamber serves to reduce the pressure on the liquid within the cooling chamber. This pressure may be regulated by correlating the speed of rotation of this pump with the pressure at which liquid is fed into the cooling chamber. The apparatus described is suitable for making several different fatty food products such as margarine, shortening, etc., and it may be desirable to employ different pressures within the cooling chamber with different products.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for producing a solid fatty product comprising means for cooling a liquid below its solidifying point while maintaining the cooled liquid in a flowable condition, a solidifying chamber for receiving the cooled liquid, and means for forcibly withdrawing said cooled liquid from said cooling means, agitating the liquid and introducing it immediately in a flowable condition into said solidifying chamber.

2. Apparatus for producing a solid fatty product comprising means for cooling a liquid below its solidifying point while maintaining the cooled liquid in a flowable condition, a solidifying chamber for receiving the cooled liquid, and a pump for withdrawing the cooled liquid from said cooling means, agitating the liquid to break up lumps therein and forcing it directly into said solidifying chamber.

3. Apparatus for producing a solid fatty product comprising means for cooling a liquid below its solidifying point while maintaining the cooled liquid in a flowable condition, a solidifying chamber for receiving the cooled liquid, and a centrifugal pump for withdrawing and agitating the cooled liquid from said cooling means and forcing it into said solidifying chamber.

4. Apparatus for producing a solid fatty product comprising means for cooling a liquid below its solidifying point while maintaining the cooled liquid in a flowable condition, a solidifying chamber for receiving the cooled liquid, a grating, and a pump for withdrawing cooled liquid from the cooling means and forcing it through said grating into said solidifying chamber.

5. Apparatus for producing continuously a hardened fatty food product comprising a cooling chamber having a relatively large ratio of cooling surface to volume of the cooling chamber, means therein for agitating liquid being cooled to maintain said liquid in a flowable condition, a solidifying chamber, and means for withdrawing cooled liquid continuously from the cooling chamber while maintaining said cooled liquid in a flowable condition and reducing lumps therein by agitation said withdrawing means also delivering the cooled liquid immediately to the solidifying chamber.

6. Apparatus as defined in claim 5 in which the withdrawing means comprises an independently driven centrifugal pump.

7. Apparatus as defined in claim 5 in which the withdrawing means comprises a pump having its suction side adjacent the outlet end of the cooling chamber.

8. Apparatus as defined in claim 5 in which the withdrawing means is arranged adjacent the agitating means to maintain the cooled liquid in a state of continuous agitation until it is delivered to the solidifying chamber.

9. Apparatus for producing a solid fatty product comprising means for cooling a liquid below its solidification point while maintaining the liquid in a flowable condition, a centrifugal pump having its inlet side adjacent said means for forcibly removing cooled liquid therefrom, grating means positioned in the outlet of said pump adjacent the path of the outer ends of the pump blades for breaking up lumps in said liquid, and means for delivering liquid forced through said grating directly into a solidifying chamber.

JACOB SCHAUB.